United States Patent [19]

Murphree

[11] 3,922,632
[45] Nov. 25, 1975

[54] AUTOMATIC VEHICLE POSITIONING SYSTEM

[75] Inventor: Francis J. Murphree, Sunnyside, Fla.

[73] Assignee: The United States of America as represented by the Secretary of the Navy, Washington, D.C.

[22] Filed: Dec. 14, 1965

[21] Appl. No.: 513,810

[52] U.S. Cl. ............................. 340/3 R; 340/3 D
[51] Int. Cl.² .......................................... G01S 9/66
[58] Field of Search .............................. 340/3, 3 D

[56] References Cited
UNITED STATES PATENTS

| | | | |
|---|---|---|---|
| 2,530,528 | 11/1950 | Kreer, Jr. | 340/6 |
| 2,808,583 | 10/1957 | Mathes | 340/3 X |
| 3,277,430 | 10/1966 | Hagemann et al. | 340/3 |

Primary Examiner—Malcolm F. Hubler
Attorney, Agent, or Firm—Richard S. Sciascia; Don D. Doty

[57] ABSTRACT

A system for guiding a forerunning slave marine vehicle over a ground course intended to be taken by an immediately following master ship regardless of the natural external ambient forces being applied thereto having a doppler sonar and computer which electrically adjusts the response parameters of a phase detection sonar located on the master ship in such manner as to compensate for the drift thereof when said phase detection sonar is receiving a bearing indication signal from the slave marine vehicle to be guided. An error signal representing the deviation of the slave marine vehicle from the intended ground course of the master ship is generated by said drift compensated phase detection sonar and broadcast to the slave vehicle guidance system to effect guidance thereof back toward the intended ground course of said master ship.

8 Claims, 11 Drawing Figures

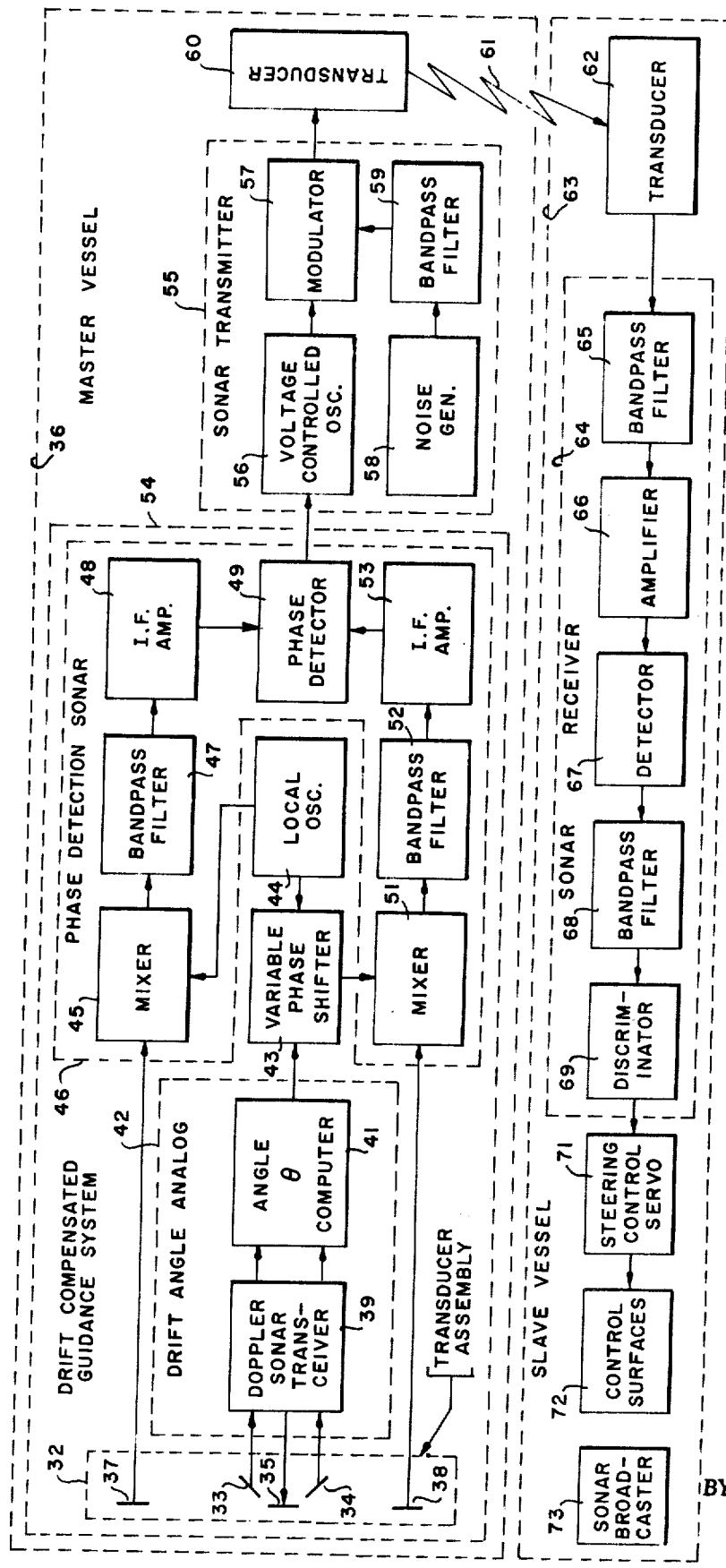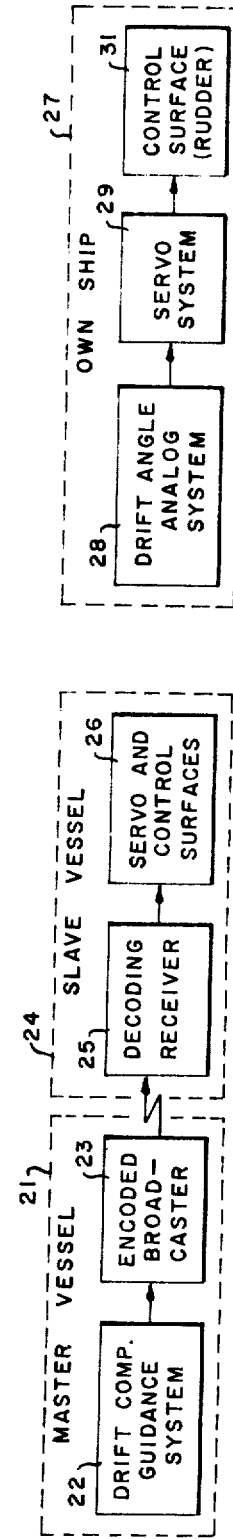

(a)
(b)
(c)
(c)

(a) (b) (c) (d) (e) (f) (g) (h) (i)

(a) (b) (c) (d) (e)

INVENTOR.
FRANCIS J. MURPHREE
BY
ATTYS

AUTOMATIC VEHICLE POSITIONING SYSTEM

The invention described herein may be manufactured and used by or for the Government of the United States of America for governmental purposes without the payment of any royalties thereon or therefor.

The present invention relates generally to navigation control systems and in particular is a system for accurately navigating a given vessel along a predetermined ground course, regardless of the natural external forces applied thereto; or for accurately guiding a slave vessel along a desired course with respect to a reference ground course, such as the ground course of a master vessel, regardless of the heading of the master vessel. In even greater particularity, it is a unique system for guiding a forerunning marine mine sweeping or mine hunting vehicle over a ground course intended to be taken or paralleled by an immediately following ship, regardless of the natural external ambient forces, such as wind and water currents, being applied to either or both thereof.

In the past, it has been very difficult, if not impossible, to make either a forerunning or aft-running mine sweeping or hunting vehicle maintain substantially the same ground course as a ship following or preceeding it, as the case may be. This is due, for example, to the fact that wind and/or water currents play on one or both during mine sweeping and hunting operations. When such conditions prevail, the ship (or master vessel) must maintain a heading that is different in direction from the ground course it is intended to cover. And, if the mine sweeping vehicle is guided to sweep on a forward or rearward extension of the ship's longitudinal axis, its ground course will obviously be different from that of the ship. Accordingly, the ship's heading is not exactly the best parameter to be used as an absolute reference for this purpose, and the actual ground course, intended or already covered, is preferably used as said reference parameter instead.

To date, the means available for guiding and navigating a mine hunting or sweeping vehicle along the intended or covered ground course of a ship has left a great deal to be desired from a controllability standpoint.

The present invention overcomes most of the disadvantages of the prior art devices, in that it controls the attitude and travel direction of a mine hunting and/or sweeping vehicle with considerably improved accuracy and, moreover, it does it automatically. In addition, the subject invention incorporates such inherent operational flexibility and capability that it may be used to effectively control the ground course of any surface or subsurface slave type of vessel, including mine sweeping and mine hunting vessels, either in a fore or aft running position relative to the ground course of any predetermined type master vessel, such as, for instance, a ship or the like. Although, as previously suggested, this particular preferred embodiment is directed toward mine hunting and sweeping operations and, thus, ordinarily involves sonar procedures, in principal the inventive concept is considered to include other but similar guidance procedures, regardless of the operational environment. Hence, with the incorporation of those design changes necessary for making the transition from one environment to another, it may readily be seen that the scope of this invention considerably exceeds that portrayed in the herewith disclosed preferred embodiment. Of course, one skilled in the art having the benefit of the teachings herewith presented could obviously effect such design changes as would be necessary for satisfactory operation of the invention in any predetermined environment, since so doing would ostensively be well within his purview.

It is, therefore, an object of this invention to provide an improved automatic vehicle positioning system.

Another object of this invention is to provide an improved method and means for minehunting along the ground course of a ship at a predetermined time and distance ahead or behind thereof.

Another object of this invention is to provide an improved method and means for mine sweeping the anticipated ground course of a ship or other marine vehicle.

Still another object of this invention is to provide an improved control system for guiding a slave vessel along or parallel to the fore or aft projection of the predetermined ground course of a master vessel.

A further object of this invention is to provide an improved method and means for navigating a plurality of tandemly disposed vehicles along a predetermined ground course.

A further object of this invention is to provide an improved method and means for automatically guiding a pair of tandemly disposed marine vessels along substantially the same ground course, regardless of the external ambient natural forces, such as wind and water currents, that are being applied thereto.

Another object of this invention is to provide an improved method and means for guiding a vehicle along a predetermined ground course.

Still another object of this invention is to provide an improved method and means for guiding a slave vehicle with respect to the ground course of a master vehicle regardless of the heading of the master vehicle.

Another object of this invention is to provide an improved method and means for adjusting the bearing reference parameter of a sonar navigation system to correspond to the ground course of a vehicle actually navigating said ground course.

Other objects and many of the attendant advantages will be readily appreciated as the subject invention becomes better understood by reference to the following detailed description when considered in conjunction with the accompanying drawings wherein:

FIG. 1 is a block diagram representation of a combination master vessel-slave vessel system which incorporates the automatic vehicle positioning system constituting this invention;

FIG. 2 is a block diagram of a navigation system incorporating the subject invention for the purpose of navigating a ship or other vehicle;

FIG. 3 is a detailed block diagram of a master vessel-slave vessel combination which incorporates the automatic vehicle positioning system constituting this invention;

Figure 10:
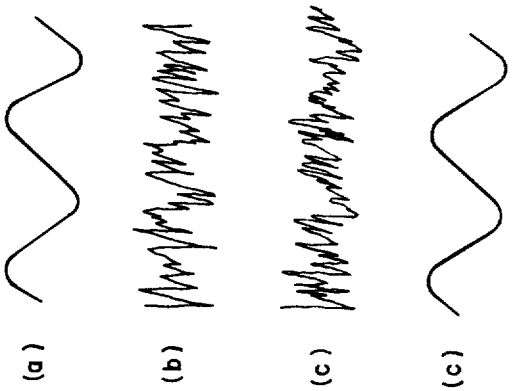
Figure 11:
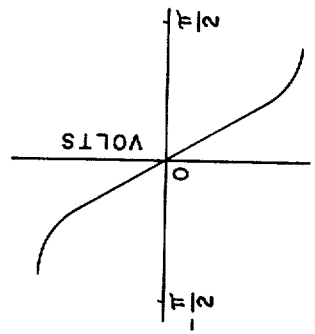
Figure 8:
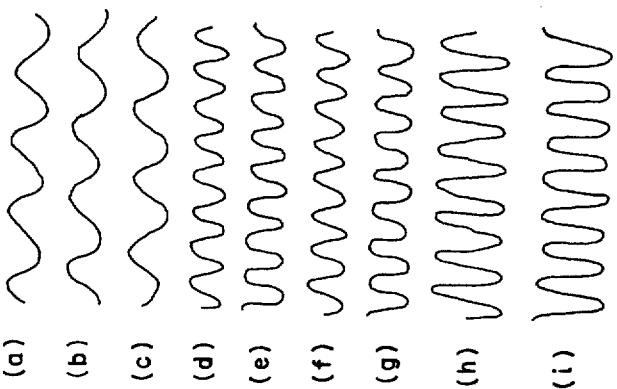
FIG. 8 illustrates a plurality of idealized signal waveforms which emanate from the various and sundry elements of the drift compensated guidance systems portion of this invention.
Figure 9:
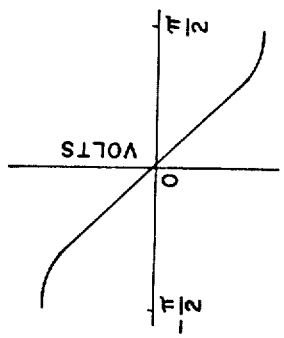
FIG. 9 depicts a typical error compensation voltage which occurs at the output of the phase detector element of the device of FIG. 3.
Figure 6:
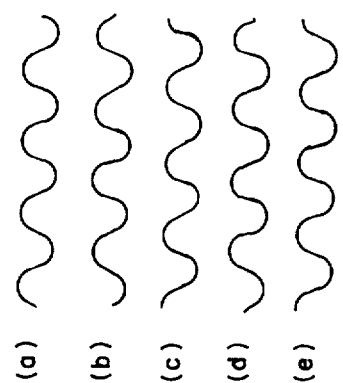
FIG. 6 is an idealized graphical representation of the signal waveforms pertinent to the various elements of the drift angle analog portion of the subject invention.

FIG. 10 graphically illustrates idealized signal waveforms which occur as outputs of the various and sundry elements of the sonar transmitter of the master vessel and the sonar receiver of the slave vessel disclosed in FIG. 3; and FIG. 11 graphically illustrates a typical steering control voltage which occurs at the output of the discriminator of the slave vessel sonar receiver depicted in FIG. 3.

Referring now to FIG. 1, there is shown a master vessel 21 which incorporates a drift compensated guidance system 22, with the output thereof connected to the input of an incoded broadcaster 23. A slave vessel 24 includes a decoding receiver 25 adapted for receiving the signal broadcast by the aforesaid incoded broadcaster 23 of master vessel 21. Connected to the output of decoding receiver 25 is a servo and control surface device 26 adapted for controlling the direction of travel of said slave vessel 24.

FIG. 2 shows a given ship 27 as incorporating a drift angle analog system 28, the output of which is coupled through a servo system 29 to any appropriate control element or surfaces 31 for navigating ship 27 along a predetermined course.

Referring now to FIG. 3, there is shown another master-slave vessel arrangement. It includes a transducer assembly 32 which contains a first pair of receiving transducers 33 and 34 and a transmitting transducer 35, all of which are rigidly mounted on a master vessel 36. Likewise incorporated in said transducer assembly is another pair of receiving transducers 37 and 38.

The outputs of the aforesaid receiving transducers 33 and 34 and the input applied to said transducer 35 are all connected to a conventional doppler sonar transceiver 39. Obviously, since in this particular preferred embodiment transceiver 39 is designed as a doppler sonar transceiver, it is intended for the broadcast and reception of acoustical energy signals. Furthermore, in order to be consistent, all of the aforementioned transducers are actually electroacoustical transducers adapted for transmitting and receiving acoustical energy, respectively. In addition, because each of the aforementioned transducers are a part of a doppler sonar system, they should be so designed as to properly function in any predetermined subaqueous medium, as is conventional in the art.

Doppler sonar transceiver 39 has a pair of outputs which are electrically coupled to the input of a computer 41 that resolves said pair of inputs into a single analog type of output which corresponds to a certain drift angle θ. As may readily be seen, in this particular instance the aforesaid doppler sonar transceiver 39, when combined with angle θ computer 41, constitutes a system herewith designated as drift angle analog 42.

The output of angle θ computer 41, and hence the output of drift angle analog 42, is applied to the control input of a variable phase shifter 43. Phase shifter 43 may be any suitable conventional type that is available commercially; or, in the alternative, it may be designed in accordance with the teachings presented at pages 949 and 950 of the book entitled Radio Engineers Handbook by Frederick E. Terman, published by the McGraw-Hill Book Company, New York, N.Y., in 1943. The other input of variable phase shifter 43 is supplied from a local oscillator 44, the output of which is a predetermined constant frequency. The same frequency signal which is applied to the aforesaid variable phase shifter 43 is also applied to one of the inputs of a mixer 45 located in a phase detection sonar system 46. The other input to said mixer 45 is obtained from the output of the aforesaid receiving transducer 37, and the output thereof is coupled through a bandpass filter 47 and an intermediate frequency amplifier 48 to one of the inputs of a phase detector 49. The output of variable phase shifter 43 is coupled to one of the inputs of a mixer 51. The other input thereto is, of course, obtained from the output of the aforesaid receiving transducer 38. The output of mixer 51, like the output of the aforesaid mixer 45, is coupled through a bandpass filter 52 which is identical to the aforementioned bandpass filter 47, and an intermediate frequency amplifier 53 which is identical to the aforementioned frequency amplifier 48 before being applied to another of the inputs of said phase detector 49.

The output signal from phase detector 49 is, of course, the output of said phase detection sonar 46 and is also the output of drift compensated guidance system 54. As may readily be seen from FIG. 3 of the drawing, all of the elements mentioned so far are incorporated in and combined as indicated to constitute said drift compensated guidance systems 54, which, of course, is located on said master vessel 36.

Also located on master vessel 36 is a sonar transmitter 55, the input of which is coupled to the output of the aforesaid phase detector 49. In practice, said phase detector 49 output is coupled to the input of a voltage controlled oscillator 56 which produces an output signal having a frequency proportional thereto. The output of voltage controlled oscillator 56 is coupled to one of the inputs of a modulator 57. A noise generator 58, which may be of any conventional type, or may even be of a pseudorandom noise generator type if so desired, has its output coupled through a bandpass filter 59 to another of the inputs of the aforesaid modulator 57. The output of modulator 57 is connected to the input of a transducer 60. Of course, as may readily be seen, the aforesaid sonar transmitter 55, as well as transducer 60, is appropriately disposed for the purpose of broadcasting predetermined types of signals from master vessel 36. Because in this particular preferred embodiment the signals intended to be broadcast are acoustical signals, transducer 60 is an electroacoustical transducer which is adapted for the broadcast of acoustical signals 61 throughout a predetermined subaqueous medium, but this invention should not be considered as limited thereto. Hence, other acoustical means, such as single sideband transmission, can be used, if so desired.

Another transducer 62 of the electroacoustical type adapted for receiving those signals 61 broadcast by electroacoustical transducer 60 is disposed upon a slave vessel 63, and the output thereof is coupled to the input of a sonar receiver 64, likewise, located on said slave vessel 63. In actual practice, the output of transducer 62 is preferably coupled to the input of a bandpass filter 65, the pass band of which is substantially similar to the pass band of the aforementioned bandpass filter 59. The output of bandpass filter 65 is coupled through an amplifier 66 to the input of a detector 67; and the output of detector 67 is coupled to the input of another bandpass filter 68, the pass band of which should be designed to pass the range of frequencies generated by voltage controlled oscillator 56. The output of bandpass filter 68 is coupled to the discriminator 69, the output of which constitutes the output of the aforesaid sonar receiver 63.

Also mounted on slave vessel 63 is a steering control servo 71 which is so coupled to appropriate control surfaces 72 that the attitude and direction of travel of said slave vessel 63 may be suitably regulated. Steering control servo 71 is, of course, appropriately energized by the output of discriminator 69, which is electrically coupled thereto.

Also located on slave vessel 63 is a sonar broadcaster 73 adapted for broadcasting the signals which are intended to be received by receiving transducers 37 and 38 of the aforementioned drift compensated guidance system located on master vessel 36, so as to provide an indication of the slave vessel's position at any given instant.

At this time, it should be understood that all of the components of this invention represented in block form in the block diagrams presented herein are well known and conventional per se. It is, therefore, their arrangement, interconnection, interacting and combination that constitute the subject invention and effects the unique results produced thereby.

Figure 4:
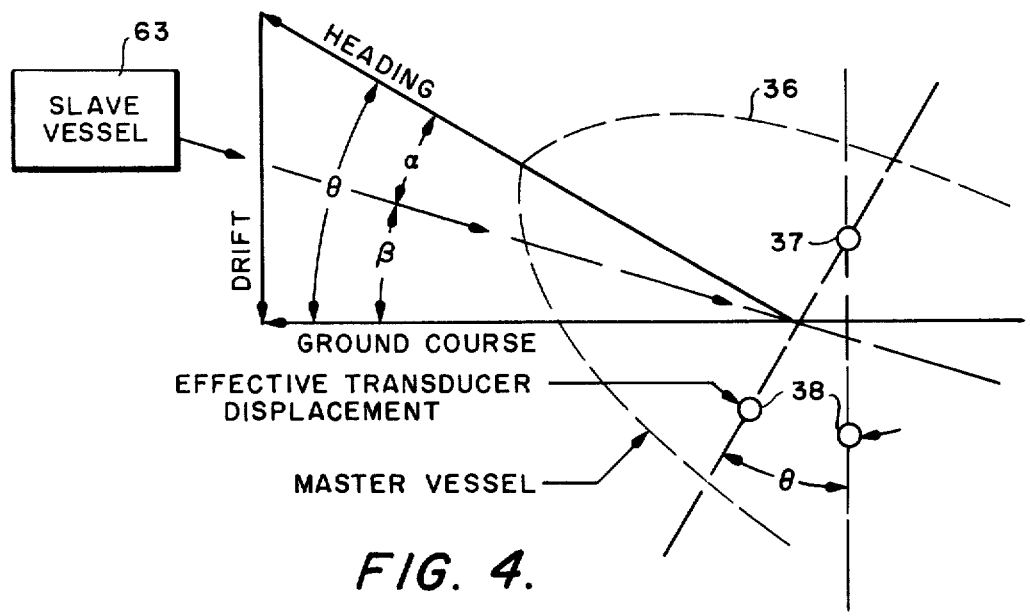
FIG. 4 is a quasi-pictorial view of the invention which facilitates discussing the theory of operation thereof.

In theory, as shown in FIG. 4 (and using the device of FIG. 3 as representing the structural elements mentioned) in the event master vessel or ship 36 is being acted upon by some external force such as a wind or water current, it must head into that wind or water current at some angle θ which will compensate therefor, in order to maintain any given ground course. At such time, the ship will have a heading that may be somewhat deceptive as far as actual ground course is concerned. If slave vehicle 63 such as, for instance, a mine hunting or mine sweeping vessel, is intended to be driven ahead of said ship in such manner that its ground course will be the same as that subsequently traveled by the ship, it, too, will probably have to be guided to correct for angle θ, as well as for any other external forces applied thereto by its ambient environment. The most effective way to cause such performance to occur is to guide the slave vessel while using the ship's ground course as a reference parameter.

The ship's ground course may be obtained for all practical purposes by drift angle analog system 42. Such system, in effect, causes receiving transducers 37 and 38 to be relatively shifted electrically an amount equal to drift angle θ (thereby compensating therefor), even though they are physically mounted on the ship in a stationary manner. The bearing angle β is then measured with respect to said drift angle compensated transducers and, thus, with respect to the ground course of said ship, inasmuch as the drift angle compensated transducers are now effectively aligned normal to said ground course.

The graphics of FIG. 4 are obviously exaggerated to facilitate disclosing the principles involved. However, as may readily be discerned, as the slave vessel is guided toward the anticipated ship's ground course, angle β approaches zero degrees. In actual practice, moreover, the slave vessel will hunt along said ground course; but for all practical purposes, including mine hunting and sweeping purposes, the ground course of the ship is traversed, regardless of whether the slave vessel preceedes or succeeds it.

Figure 5:
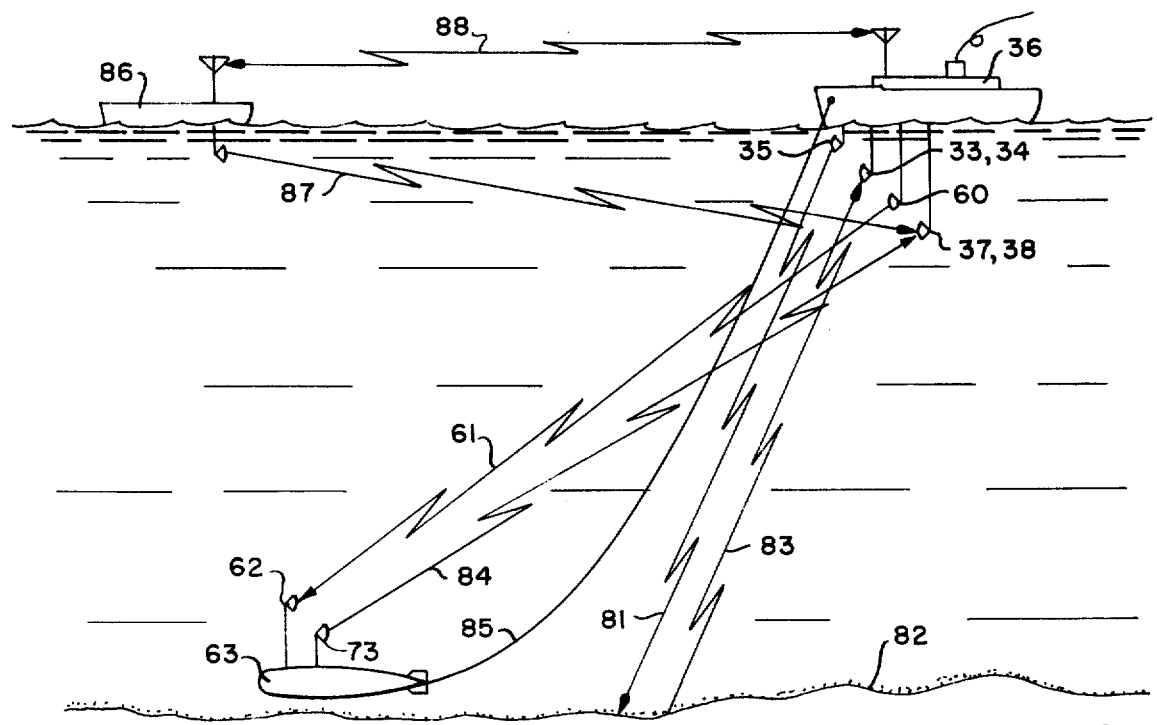
FIG. 5 is a quasi-pictorial illustration of a typical mine hunting and/or sweeping operation which may incorporate the subject invention to an advantage.

FIG. 5 discloses a quasi-pictorial view of several typical master-slave vessel combinations which may incorporate the subject invention to an advantage. In this particular instance, the invention embodiment disclosed in FIG. 3 will be used for illustrative purposes and, accordingly, similar elements will have the same reference numerals.

Thus, it may readily be seen that forerunning slave vessel 63 is a submarine type vessel and is being guided to travel along the projected ground course of master ship or vessel 36. The ship's doppler system, doppler sonar transceiver 39, determines its true ground course by broadcasting acoustical energy 81 by transducer 35, and this energy is reflected from sea floor 82 as an echo 83 to receiving transducers 33 and 34.

Sonar broadcaster 73, located on slave vessel 63, broadcasts acoustical energy 84 to transducers 37 and 38 so that the position of slave vessel 63 relative thereto is continuously ascertained, and thus the desired guidance thereof may be automatically effected, as will be more fully discussed below in the discussion of the operation of the invention. A tether line 85 between ship 36 and vehicle 63 may be used to connect the two together and also to act as electrical conductors for the purpose of supplying electrical energy and/or navigation signals thereto, if so desired. Said tether line is, of course, optional, with the use thereof dependent upon operational circumstances.

An appropriate surface vessel 86 may be used in lieu of or in combination with submarine vessel 63. Its position may be indicated by either sonar-broadcasted acoustical energy 87 or electromagnetic energy 88 broadcast by conventional radio or both, as preferred or warranted by any given operational conditions.

The operation of the subject invention will now be discussed briefly in connection with FIGS. 3 through 11.

As master vessel 36 (shown in FIG. 5 as ship 36) travels along, sonic energy 81, such as is exemplarily shown in FIG. 6a, is broadcast toward sea floor 82 by the transmitter portion of transceiver 39 and transducer 35. The echo 83 thereof is timely received by transducers 33 and 34 and the receiver portion of transceiver 39, as is indicated by the phase relationship of the waveform of FIGS. 6b and c, with the respective relative arrival times thereat being contingent upon whether or not ship 36 is drifting off course as a result of external spurious forces such as wind and water currents being applied thereto. And as a consequence of this, two output signals, such as those illustrated in FIGS. 6d and e, emanate from doppler sonar transceiver 39 which, in fact, have relative frequency relationships that correspond to the angle of drift, θ, of the ship, if any; and when these are conventionally resolved by θ computer 41, an analog voltage representing said drift angle is produced, which acts as the control signal voltage that adjusts variable phase shifter 43 to cause it to produce an electrical phase shift.

As is well known in the art, the electrical phase difference between the outputs of two contiguously disposed hydrophones having a distance therebetween that is less than one-half of the wavelength of the operating frequency is:

$$\psi = \frac{S \sin \alpha}{\lambda} \cdot 360°, \qquad (1)$$

where,

Ψ is the electrical phase shift in degrees,

S is the distance between hydrophones in feet,

α is the angle in degrees between the bisecting normal to a straight line interconnecting the hydrophones and a line to the signal source, and λ is the wavelength of the operating frequency in feet.

Figure 7:
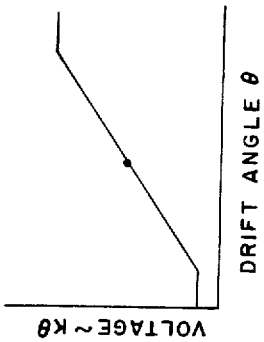
FIG. 7 is a graphical representation of the drift angle correction voltage which corresponds to the output of the angle $\theta$ computer of the drift angle analog in the device of FIG. 3.

If the aforementioned angle α is small, say less than 25°, the following expression may be assumed to calculate electrical phase shift:

$$\psi = \frac{S\alpha}{\lambda} \cdot 360°, \qquad (2)$$

where the symbols Ψ, S, and λ are defined the same as they were in equation 1 and α is measured in radians, since the error in making such assumption would, likewise, be small. On the other hand, if angle α is greater than the radian equivalent of 25°, it is preferable that the phase shifter be designed so that its output is proportional to the relations expressed in equation 1. The characteristic curve which includes the phase shifter control voltage is shown in FIG. 7 and, of course, this curve actually constitutes the voltage control range which may be effected by θ computer 41; and, as may readily be seen, this voltage likewise constitutes analog output voltage of drift angle analog system 42 and is the voltage that is supplied to the control input of variable phase shifter 43. Hence, the output from local oscillator 44 which is also applied to variable phase shifter 43 has its phase shifted by an amount proportional to drift angle θ. Said phase shift may, of course, occur either in the advance or retard direction, depending upon the direction of drift of said ship. Thus, for example, if the incoming acoustical wave front such as that shown in FIG. 8a and originally transmitted by sonar broadcaster 73 located on slave vessel 63, arrives at transducer 37 first, the signal waveforms, such as are illustrated in FIGS. 8b and c, may be obtained from receiving transducers 37 and 38. Therefore, the inputs to mixers 45 and 51 will be phase shifted in proportion to the aforesaid arrival times, and the combined or mixed signal outputs from mixers 45 and 51 will likewise be shifted, accordingly.

Local oscillator 44 acts as the reference frequency for mixer 45 as well as mixer 51. However, as may readily be seen, no phase shift occurs therebetween as its output is directly supplied to one of the inputs of mixer 45. Hence, the output of mixer 45 has not been adjusted to compensate for the doppler ascertained drift θ, while the output of mixer 51 has. The relative phase relationships of these two output signals, that is, the outputs from mixers 45 and 51, are shown in idealized form in FIGS. 8d and e. Once said phase relationships are in existence, they effectively cause receiving transducers 37 and 38 to be electrically aligned along a common axis that is normal to the ship's ground course. After filtering to remove unwanted signals therefrom by bandpass filters 47 and 52 respectively, and after being amplified to a more useful level by intermediate amplifiers 48 and 53 respectively, these signals acquire wave forms which are substantially similar to those ideally depicted in FIGS. 8h and i. In this form, they are applied as a pair of phase related inputs to phase detector 49, the output of which then becomes another analog signal that falls somewhere on the characteristic curve of FIG. 9 and which represents the direction of travel of the aforementioned wave front emanating from sonar broadcaster 73 located on slave vessel 63 and, therefore, is indicative of the bearing of said slave vessel 63 relative to the ground course of the aforesaid ship 36.

The output of phase detector 49, in fact, constitutes the output of drift compensated guidance system 54. It is further processed by sonar transmitter 55 in order that it be put into a cryptographic form that facilitates the secure communication thereof throughout the predetermined ambient environment in which it is operating—in this case sea water. In practice, and in this particular preferred embodiment, this processing is effected by having the output voltage of phase detector 49 applied to the input of voltage control oscillator 56. The resulting adjusted frequency output of this oscillator is shown typically and in idealized form in FIG. 10a, and is mixed in modulator 57 with a noise-like signal typically illustrated in FIG. 10b that is generated by noise generator 58. The resulting signal is then broadcast by transducer 60 as a relatively secure acoustical signal 61 which may, for example, have the appearance of the wave form shown in FIG. 10c. Assuming that little or no adverse, spurious modulation takes place during the travel of the output signal from transducer 60, the input to receiving transducer 62 will, likewise, appear comparable to the wave form shown in FIG. 10c. Of course, it is recognized, that such situation may only occur ideally, and that some contamination of said idealized waveform will take place, as it travels through its subaqueous environment. It is then received by receiving transducer 62 located on slave vessel 63 for the purpose of controlling the direction of travel thereof. This control is, of course, effected by further processing said received signal within sonar receiver 64. Again, in actual practice, it is filtered by bandpass filter 65 in order to remove any spurious signals that may have otherwise degraded its effectiveness as it is received by transducer 62, it is amplified to a more useful level by amplifier 66, and then it is detected by detector 67 in order to extract the envelope thereof and produce a signal having a wave form substantially similar to that shown in FIG. 10d in idealized form. Of course, this signal is substantially similar to that produced by the aforesaid voltage control oscillator 56. Applying it to discriminator 69 then causes it to be converted to some particular voltage that falls on the characteristic curve of FIG. 11 and which is suitable for being applied to steering control servo system 71 for ultimately effecting the proper positioning of slave vessel control surface 72, so that slave vessel 63 will be constantly guided toward the ship's ground course and, thus, hunt therealong.

Obviously, other modifications of this embodiment or other embodiments of the subject invention will readily come to the mind of one skilled in the art having the benefit of the teachings presented herein in accompaniment with the associated drawings. Therefore, it is to be understood that the invention is not to be limited thereto and that said modifications and other embodiments are intended to be included within the scope of the appended claims.

What is claimed is:

1. An automatic vehicle positioning system comprising in combination:

means for producing a signal proportional to the drift angle of a moving master vessel having spurious ambient forces applied thereto which causes the drift thereof from an intended ground course;

a pair of receiving transducers for receiving a predetermined signal broadcast from a slave vehicle intended to be navigated along the aforesaid intended master vessel ground course;

a variable phase shifter having a control input, a controlled input, and an output, with the control input thereof coupled to the output of said drift angle proportional signal producing means;

a local oscillator, with the output thereof coupled to the controlled input of said variable phase shifter;

a first mixer having a pair of inputs and an output, with one of the inputs thereof coupled to the output of said local oscillator, and the other of the inputs thereof coupled to the output of one of the aforesaid pair of receiving transducers;

a second mixer having a pair of inputs and an output, with one of the inputs thereof connected to the other of said pair of receiving transducers, and the other input thereof connected to the output of said variable phase shifter;

a pair of bandpass filter means respectively connected to the outputs of said first and second mixers;

a phase detector effectively coupled to the outputs of said pair of bandpass filter means for producing an error compensating signal proportional to the phase relationship of the outputs thereof;

means mounted on said master vessel and connected to the output of said phase detector for effectively broadcasting said error compensating signal towards the slave vehicle to be navigated;

means mounted on said slave vehicle for receiving the error compensating signal broadcast by the aforesaid broadcasting means and for converting same into a navigation control signal proportional thereto; and means connected to the output of said immediately preceeding receiving and converting means and mounted on said slave vehicle for the steering thereof toward the intended ground course of said master vessel in response to the aforesaid navigation control signal.

2. The device of claim 1 wherein said means for producing a signal proportional to the drift angle of a moving master vessel having spurious ambient forces applied thereto which causes the drift thereof from an intended ground course comprises:

a doppler sonar transceiver including a transmitter and a receiver;

a transmitting transducer connected to the transmitter portion of said doppler sonar transceiver for broadcasting acoustical energy at a predetermined angle toward the sea floor located substantially under said moving master vessel;

a pair of receiving transducers connected to the receiver portion of said doppler transceiver for receiving the acoustical energy broadcast by the aforesaid transmitting transducer after it is reflected from said sea floor; and a computer connected to the outputs of said doppler sonar transceiver for computing the drift angle of said master vessel therefrom as it moves along its intended ground course and for producing an output signal proportional thereto.

3. The device of claim 1 wherein said means mounted on said master vessel and connected to the output of said phase detector for effectively broadcasting said error compensating signal towards the slave vehicle to be navigated comprises:

a cryptographic encoding sonar transmitter; and a transducer connected to the output of said cryptographic encoding sonar transmitter.

4. The device of claim 1 wherein said means mounted on said master vessel and connected to the output of said phase detector for effectively broadcasting said error compensating signal towards the slave vehicle to be navigated comprises:

a voltage controlled oscillator;

a modulator having a pair of inputs and an output, with one of the inputs thereof coupled to the output of said voltage controlled oscillator;

a noise generator;

a bandpass filter interconnecting the output of said noise generator and the other input to said modulator; and a transducer connected to the output of the aforesaid modulator.

5. The device of claim 1 wherein said means mounted on said slave vehicle for receiving the error compensating signal broadcast by the aforesaid broadcasting means and for converting same into a navigation control signal proportional thereto comprises:

a transducer;

a first bandpass filter connected to the output of said transducer;

an amplifer coupled to the output of said first bandpass filter;

a detector connected to the output of said amplifier;

a second bandpass filter connected to the output of said detector; and a discriminator connected to the output of said second bandpass filter.

6. The device of claim 1 wherein said means connected to the output of said immediately preceeding receiving and converting means and mounted on said slave vehicle for the steering thereof toward the intended ground course of said master vessel in response to the aforesaid navigation control signal comprises:

a steering control servo; and at least one control surface effectively connected to said steering control servo and mounted on said slave vehicle for the attitude and direction control thereof in an amount corresponding to the aforesaid navigation control signal.

7. The invention according to claim 1 further characterized by a sonar means disposed on said slave vehicle for broadcasting the aforesaid predetermined signal to said pair of receiving transducers.

8. The invention according to claim 1 further characterized by a pair of intermediate frequency amplifiers respectively connected between the outputs of said pair of bandpass filters and the inputs of the aforesaid phase detector.

* * * * *